United States Patent
Kazdaghli

(10) Patent No.: US 10,963,666 B2
(45) Date of Patent: Mar. 30, 2021

(54) METHOD FOR OBTAINING A FINGERPRINT IMAGE

(71) Applicant: IDEMIA IDENTITY & SECURITY FRANCE, Courbevoie (FR)

(72) Inventor: Laurent Kazdaghli, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/529,312

(22) Filed: Aug. 1, 2019

(65) Prior Publication Data

US 2020/0050821 A1    Feb. 13, 2020

(30) Foreign Application Priority Data

Aug. 10, 2018    (FR) ...................................... 18/57448

(51) Int. Cl.
*G06K 9/00*    (2006.01)

(52) U.S. Cl.
CPC ..... *G06K 9/00046* (2013.01); *G06K 9/00087* (2013.01)

(58) Field of Classification Search
CPC .......... G06K 9/00046; G06K 9/00087; G06K 9/00006–0012; G06K 9/34; G06F 21/32
See application file for complete search history.

(56) References Cited

U.S. PATENT DOCUMENTS

| 2017/0004351 A1* | 1/2017 | Kim .................. G06K 9/00087 |
| 2018/0165508 A1* | 6/2018 | Othman .................. G06K 9/42 |

FOREIGN PATENT DOCUMENTS

WO    2018/106987 A1    6/2018

OTHER PUBLICATIONS

Jun. 13, 2019 Search Report issued in French Patent Application No. 1857448.
Weixin et al; "Fingerprint Segmentation Based on Improved Actie Contour;" 2009 International Conference on Networking and Digital Society; pp. 44-47; 2009.
Chen et al; "Segmentation of Fingerprint Images Using Linear Classifier;" EURASIP Journal on Applied Signal Process 2004; 480-494; 2002.
Bazen et al; "Segmentation of Fingerprint Images;" ProRISC 2001 Workshop on Circuits, Systems and Signal Processing; 2001.

(Continued)

*Primary Examiner* — Stephen G Sherman
(74) *Attorney, Agent, or Firm* — Oliff PLC; R. Brian Drozd

(57) ABSTRACT

A method for obtaining an image of at least one fingerprint from a sequence of images is disclosed. The method comprises a segmentation of images in a sequence of acquired images making it possible to determine regions liable to comprise a fingerprint, a tracking of regions determined along with the sequence of images and a calculation of a confidence mark for each region determined. The confidence mark of a region determined is incremented (or respectively decremented) at each acquired image if the region is present in (or respectively absent from) the image, the increment (or respectively the decrement) being dependent on the predefined image acquisition frequency. Information making it possible to obtain a final image containing fingerprints is generated by the method when a predefined number of regions each having reached a confidence mark at least equal to a predetermined threshold is obtained.

9 Claims, 3 Drawing Sheets

(56) References Cited

OTHER PUBLICATIONS

Dhanachandra et al; "Image Segmentation using K-means Clustering Algorithm and Subtractive Clustering Algorithm;" Eleventh International Multi-Conference on Information Processing; pp. 764-771; 2015.
Azmi et al; "A New Markov Random Field Segmentation Method for Breast Lesion Segmentation in MR Images;" Journal of Medical Signals & Sensors; vol. 1; Issue 3; pp. 156-164; Sep.-Dec. 2011.
Yilmaz et al; "Object Tracking: A Survery;" ACM Computing Surveys; Vo. 38; No. 4; Article 14; pp. 1-45; Dec. 2006.
R. E. Kalman; "A New Approach to Linear Filtering and Prediction Problems;" Transactions of the ASME—Journal of Basic Engineering. vol. 82, 1960, p. 33-45.
Natan Peterfreund; "Robust Tracking of Position and Velocity with Kalman Snakes;" IEEE Transacations on Pattern Analysis and Machine Intelligence; vol. 21; No. 6; pp. 564-569; Jun. 1999.
Saravanan et al; "Video Object Detection and Tracking using kalman filter and color histogram-based Matching algorithm;" International Journal of Engineering Research and Development; vol. 9; Issue 7; pp. 31-39; Jan. 2014.
Bertalmio et al; "Morphing Active Contours;" IEEE Transactions on Pattern Analysis and Machine Intelligence; vol. 22; No. 7; pp. 733-737; Jul. 2000.
Hsu et al; "Multiple Object Tracking using Particle Swarm Optimization;" International Journal of Electronics and Communication Engineeing; vol. 6; No. 8; pp. 744-747; 2012.
Zhou et al; "Object tracking using SIFT feautures and mean shift;" Computer Vision and Image Understanding; vol. 113; pp. 345-352; 2009.

\* cited by examiner

METHOD FOR OBTAINING A FINGERPRINT IMAGE

The invention relates to a method for obtaining an image of at least one fingerprint from a plurality of images acquired by an image sensor of a fingerprint capture system and a device implementing the method.

CONTEXT OF THE INVENTION

The use of fingerprints, for example of the type consisting of a print of a finger, of a plurality of fingers or of the palm of a hand, makes it possible to protect access to buildings or machines. Using this technology reinforces security since the probability of two persons having two identical fingerprints is almost zero.

A fingerprint capture system makes it possible to obtain at least one image of at least one fingerprint. In the case of identification, each print is compared with a set of reference fingerprints contained in a database. In the case of authentication, each print is compared with a single fingerprint. The comparison makes it possible to determine whether or not each fingerprint obtained belongs to a person referenced in the database or whether the person is indeed the one that he claims to be.

Some fingerprint capture systems capture a sequence of images of prints. This is in particular the case with certain systems for capturing fingerprints by contact that are not configured to ensure stability of the finger or fingers in front of the image sensor or not configured so that each finger is pressed in the same way and at the same moment on the fingerprint capture system. This is also the case with contactless fingerprint capture systems in front of which the finger or fingers are passed without any finger touching said system. During the image capture, each finger is in movement in front of the image sensor. This type of image capture system then uses a method for obtaining images making it possible to obtain a final image from images in the sequence. The final image corresponds either to the image of the sequence best representing each fingerprint, or to portions of images in the sequence, each portion best representing a print.

Many current fingerprint capture systems use image sensors, referred to as optical sensors, such as CCD (charge-coupled device) image sensors or CMOS (complementary metal-oxide-semiconductor) image sensors. Other types of image sensor such as TFT (thin-film transistor) image sensors, referred to as TFT sensors, could advantageously be used in the fingerprint capture systems.

The images acquired by an image sensor have different properties according to the type of image sensor used. Thus an optical sensor has an image acquisition frequency lower than a TFT sensor. However, images acquired by an optical sensor, because of the greater time of acquisition thereof, are of a quality superior to the images acquired by a TFT sensor.

The image-obtaining methods used by fingerprint capture systems capturing a sequence of images of prints are in general suited to the characteristics of the image sensor used by said system. These methods are in particular suited to the image acquisition frequency of these sensors. Thus a method intended to function with images supplied by an optical sensor (or respectively a TFT sensor) cannot function correctly with images supplied by a TFT sensor (or respectively an optical sensor).

It is desirable to overcome these drawbacks of the prior art. It is in particular desirable to propose a method for obtaining images that can be adapted to any type of image sensor used.

DISCLOSURE OF THE INVENTION

According to a first aspect of the invention, the invention relates to a method for obtaining an image of at least one fingerprint from a sequence of images acquired by an image sensor of a fingerprint capture system making acquisitions of images with a predefined image acquisition frequency dependent on said image sensor. The method comprises: obtaining an image, referred to as the first segmented image, resulting from an application of an image segmentation method to a first acquired image, said segmentation method being suitable for identifying regions corresponding to prints in an image; for each acquired image, referred to as the second acquired image, following the first acquired image, applying a processing comprising: obtaining an image, referred to as the second segmented image, resulting from an application of the image segmentation method to the second acquired image; applying a region-tracking method to the regions identified in each segmented image from the first segmented image to the second segmented image; determining a confidence mark for each region identified, the confidence mark of a region of the second segmented image associated with a region of a previous segmented image being a sum between the confidence mark of said region of the previous image and an increment dependent on the predefined image acquisition frequency; and determining a number of regions, referred to as admissible regions, identified in the segmented images from the first segmented image to the second segmented image having a confidence mark higher than a first predetermined threshold; and, when the number of admissible regions is equal to a second predetermined threshold, ending the acquisitions of images and generating information making it possible to obtain an image comprising, for each admissible region, a zone of an acquired image corresponding to the admissible region.

The method therefore makes it possible to adapt the change in the confidence mark of each region according to the image acquisition frequency. In this way, the method for obtaining an image is suited to any type of image sensor.

According to one embodiment, the confidence mark of a region identified in at least one segmented image preceding the second segmented image but not having a corresponding region in the second segmented image is a difference between the confidence mark of said region of the previous segmented image and of a second increment dependent on the predefined image acquisition frequency.

Thus the confidence mark of a region detected in a previous segmented image increases when said region is detected in the second segmented image and decreases when said region is not detected in the second segmented image.

According to one embodiment, for each region of the second segmented image not having a corresponding region in a previous segmented image, referred to as a new region, determining that the new region corresponds to a region found in a previous segmented image, referred to as an existing region, if a criterion representing a correlation between the new region and at least one existing region is met.

Thus, if the region tracking method does not make it possible to track a region detected in a previous segmented image in the second segmented image, it is possible to determine by an alternative method whether this region is present in the second segmented image.

According to one embodiment, the criterion representing a correlation between a new region and an existing region is dependent on a ratio between a surface area of an intersection between the existing region and the new region and a minimum surface-area value between the surface area of the new region and the surface area of the existing region and/or dependent on a distance between a centre of gravity of the new region and a centre of gravity of the existing region.

According to one embodiment, when the number of admissible regions is below the second predetermined threshold, applying the processing for a new second acquired image if a period of time since the acquisition of the first acquired image is less than or equal to a predetermined period of time.

According to one embodiment, if the period of time since the acquisition of the first acquired image is greater than the predetermined period of time, ending the image acquisitions and generating information for generating an image comprising a number of acquired image zones no more than the second predetermined threshold, each zone corresponding to an identified region in the segmented images from the first segmented image to the second segmented image, each region used for defining a zone having a confidence mark higher than the confidence marks of the zones not used for defining a zone.

Thus the method has a maximum duration, which makes it possible to prevent a user remaining in front of the fingerprint capture system for too long. The method makes it possible despite everything to obtain information for generating an image, even if some regions used for defining a zone of this image have an insufficient confidence mark.

According to one embodiment, each increment is inversely proportional to the predefined image acquisition frequency.

Thus the confidence mark of a region issuing from a sensor having a low acquisition frequency changes more quickly than the confidence mark of a region issuing from a sensor having a higher acquisition frequency. The number of images necessary for generating information for obtaining an image comprising, for each admissible region, a zone of an acquired image corresponding to the admissible region is therefore smaller when the image sensor used has a low image acquisition frequency than when the image sensor use has a higher image acquisition frequency.

According to a second aspect of the invention, the invention relates to a device for obtaining an image of at least one fingerprint from a sequence of images acquired by an image sensor of a fingerprint capture system making acquisitions of images with a predefined image acquisition frequency dependent on said image sensor. The device comprises: obtaining means for obtaining an image, referred to as the first segmented image, resulting from an application of an image segmentation method to a first acquired image, said segmentation method being suitable for identifying regions corresponding to prints in an image; obtaining means for obtaining at least one image, referred to as the second segmented image, resulting from an application of the image segmentation method to at least one image acquired following the first acquired image, referred to as the second acquired image; processing means for applying a region-tracking method to the regions identified in each segmented image from the first segmented image to the second segmented image; processing means for determining a confidence mark for each identified region, the confidence mark of a region of the second segmented image associated with a region of a previous segmented image being a sum between the confidence mark of said region of the previous image and an increment dependent on the predefined image acquisition frequency; and processing means for determining a number of regions, referred to as admissible regions, identified in the segmented images from the first segmented image to the second segmented image having a confidence mark higher than a first predetermined threshold; and processing means for ending the acquisitions of images when the number of admissible regions is equal to a second predetermined threshold, and for generating information for obtaining an image comprising, for each admissible region, a zone of an acquired image corresponding to the admissible region.

According to a third aspect of the invention, the invention relates to a system comprising a device according to the second aspect.

According to a fourth aspect, the invention relates to a computer program, comprising instructions for the implementation, by a device, of the method according to the first aspect, when said program is executed by a processor of said device.

According to a fifth aspect, the invention relates to storage means, storing a computer program comprising instructions for the implementation, by a device, of the method according to the first aspect, when said program is executed by a processor of said device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF VARIOUS EMBODIMENTS

The method of the invention is described in a context where a system for capturing fingerprints by contact using a TFT sensor makes acquisitions of images of a plurality of fingers. The method is however suitable for functioning with a system for capturing fingerprints by contact using an optical sensor or a contactless fingerprint capture system using an optical sensor or a TFT sensor.

Figure 1:
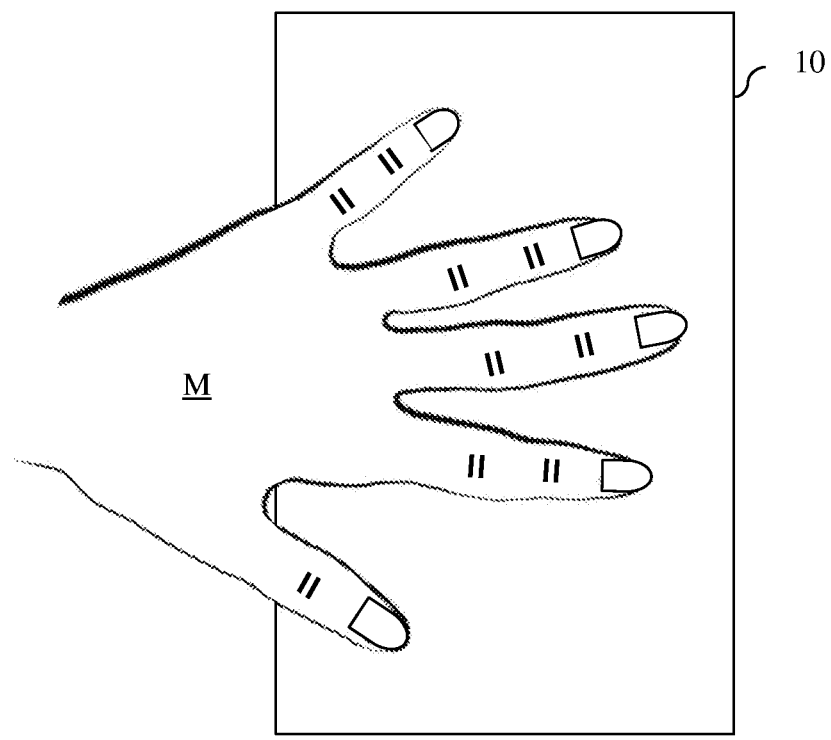
FIG. 1 describes schematically an example of a fingerprint capture system using the method according to the invention.

FIG. 1 describes schematically an example of a fingerprint capture system using the method according to the invention.

In FIG. 1, a plurality of fingers of a hand M is placed on a fingerprint capture system 10.

Figure 2:
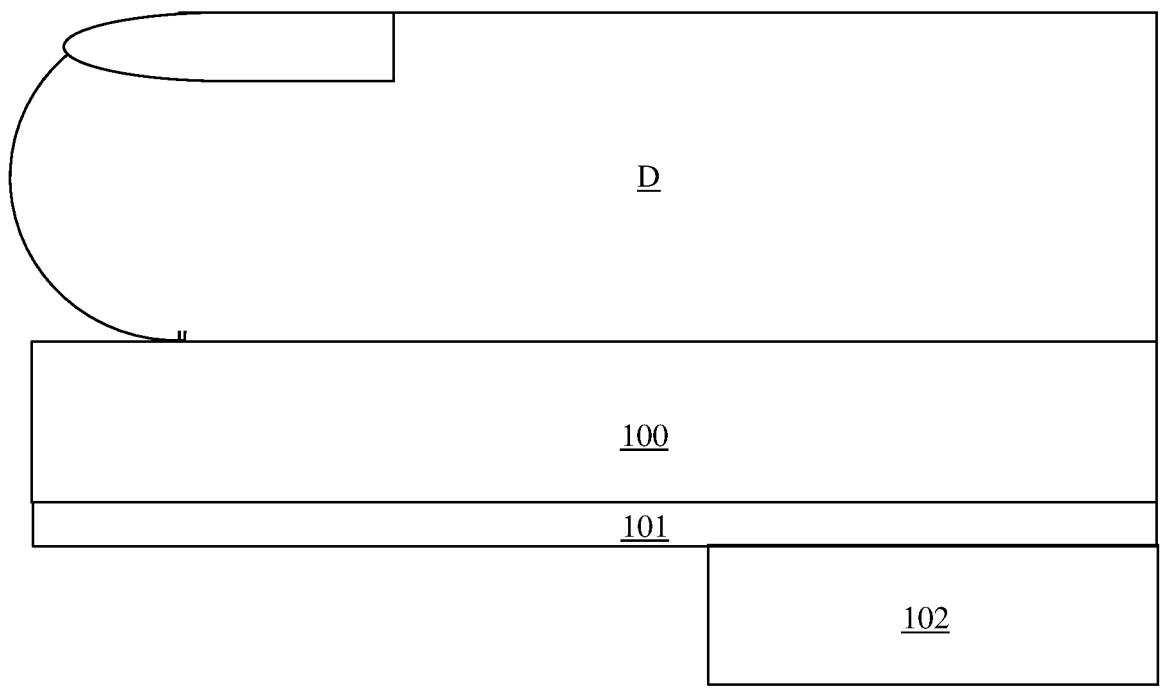
FIG. 2 illustrates schematically in detail the fingerprint capture system.

FIG. 2 illustrates schematically in detail the fingerprint capture system 10.

The fingerprint capture system 10 comprises a transparent plate 100 comprising a top face on which the plurality of fingers is placed, only one finger D of which is depicted in FIG. 2. Situated under the transparent plate 100 and bonded to the bottom face of said plate, the fingerprint capture system 10 comprises a TFT sensor 101. The TFT sensor 101 is positioned so as to generate an image of the plurality of fingers. The fingerprint capture system 10 also comprises a processing module 102.

Figure 3:
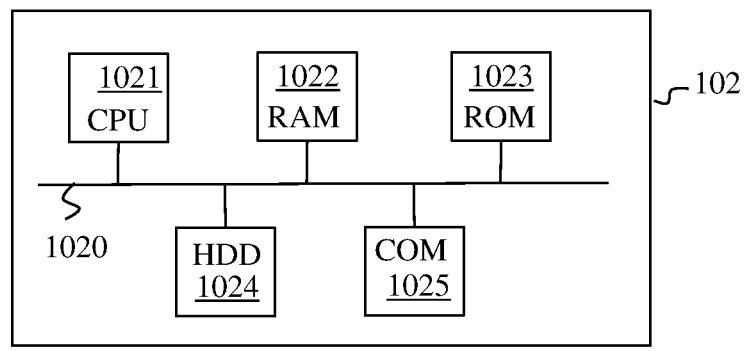
FIG. 3 illustrates schematically an example of hardware architecture of a processing module implementing the method according to the invention.

FIG. 3 illustrates schematically an example of hardware architecture of the processing module 102.

According to the example of hardware architecture depicted in FIG. 3, the processing module 102 then comprises, connected by a communication bus 1020: a processor or CPU (central processing unit) 1021; a random access memory RAM 1022; a read only memory ROM 1023; a storage unit such as a hard disk or a storage medium reader, such as an SD (Secure Digital) card reader 1024; at least one communication interface 1025 enabling the processing module 102 to receive the images acquired by the image sensor 101.

The processor 1021 is capable of executing instructions loaded in the RAM 1022 from the ROM 1023, from an external memory (not shown), from a storage medium (such as an SD card), or from a communication network. When the processing module 102 is powered up, the processor 1021 is capable of reading instructions from the RAM 1022 and executing them. These instructions form a computer program causing the implementation, by the processor 1021, of the method described in relation to FIG. 4.

Figure 4:
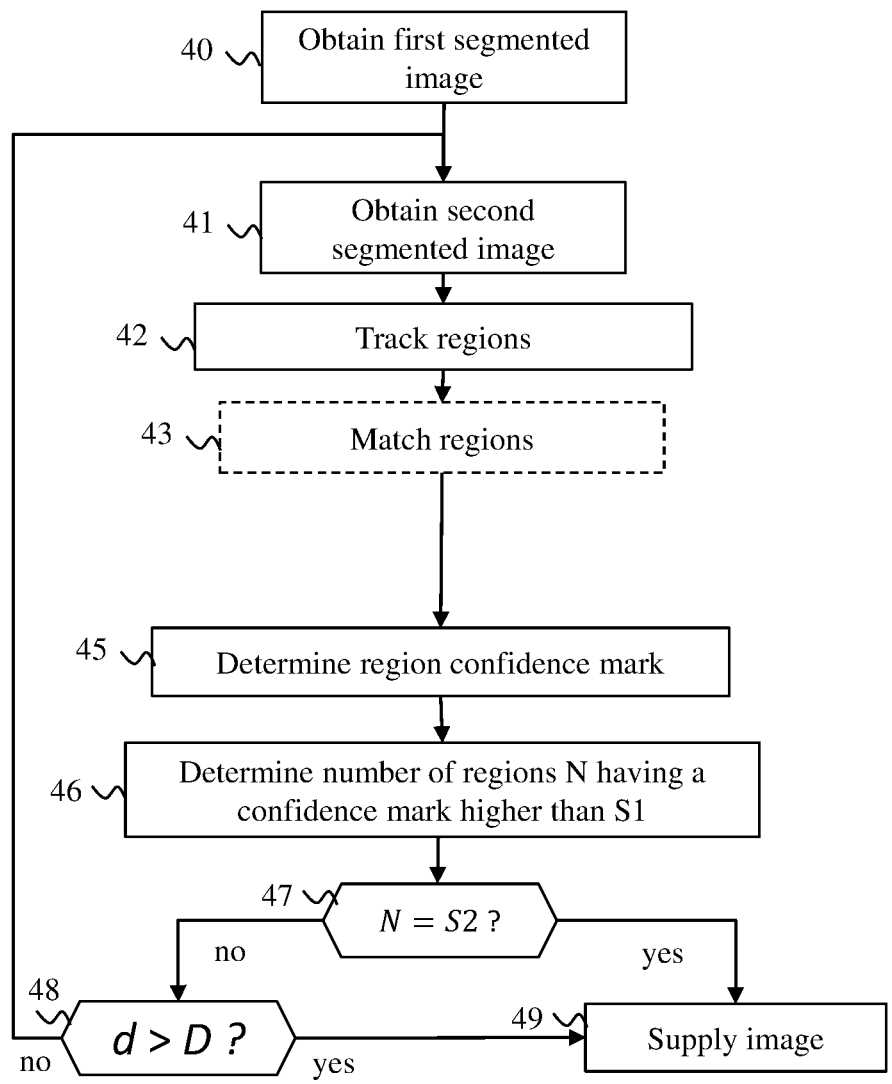
FIG. 4 illustrates schematically an example of a method for obtaining images according to the invention.

The method described in relation to FIG. 4 may be implemented in software form by the execution of a set of instructions by a programmable machine, for example a DSP (digital signal processor), a microcontroller or a GPU (graphics processing unit), or be implemented in hardware form by a machine or a dedicated component, for example an FPGA (field-programmable gate array) or an ASIC (application-specific integrated circuit).

FIG. 4 illustrates schematically an example of a method for obtaining images according to the invention.

The image sensor 101 makes acquisitions of images with a predefined image acquisition frequency F. When a user wishes to be identified or authenticated, he applies a plurality of fingers to the top face of the transparent plate 100. A triggering device, not shown in FIG. 2, then triggers an acquisition of a sequence of images. The triggering device is for example a button that the user presses when he applies his hand to the top face of the transparent plate 100 or a photoelectric cell that triggers the acquisition of the sequence of images when the presence of at least one finger is detected on said top face.

At the same time as it triggers the acquisition of the image sequence, the triggering device starts a timer that measures a period d from the acquisition of the first image in an image sequence.

In a step 40, the processing module 102 obtains an image, referred to as the first segmented image, resulting from an application of an image segmentation method to a first image acquired by the image sensor 101. The segmentation method is suitable for identifying regions corresponding to prints in an image. The segmentation method is for example a method described in the document *Fingerprint Segmentation Based on Improved Active Contour*, B. Weixin, X Deqin, Z. Yi-wei, *International conference on networking and digital society*, 2009 or a method described in the document X Chen, J. Tian, J. Cheng, X Yang, *Segmentation of fingerprint images using linear classifier*, *Eurasip Journal on Applied Signal Processing* 2004, P. 480-494 or a method described in the document A. M Bazen, S. H. Gerez, *Segmentation of fingerprint images*, *ProRISC* 2001 *Workshop on Circuits, Systems and Signal Processing*, Veldhoven, The Netherlands, November 2001. More general segmentation methods may also be used, such as the method described in N. Dhanachandra and al, *Image segmentation using K-means clustering algorithm and substractive clustering algorithm*, *Procedia Computer Science*, Volume 54, 2015, 764-771 or the method described in the document *A new Markov random field segmentation method for breast lesion segmentation in MR images*, *Journal of Medical Signals and Sensors*, 2011, 156-164. When the image segmentation method makes it possible to detect at least one region in an image, each region detected is represented by its contour. The contour of a region thus makes it possible to locate this region in a segmented image.

In one embodiment, each segmented image supplied by the image sensor, and therefore the first segmented image, represents each region identified by the segmentation method in the form of a mask, each pixel of a mask being represented by the same value different from a value attributed to the pixels of the background of the segmented image. Supposing that the segmented image is a grey-level image where each pixel is coded in 8 bits between 0 and 255, each pixel of the background of the segmented image is for example associated with the value 0, and each pixel of a region is associated with the value 200. In one embodiment, the pixels of two distinct regions are associated with different values.

In a step 41, the processing module 102 obtains an image, referred to as the second segmented image, resulting from an application of the image segmentation method to a second image, referred to as the second acquired image, following the first acquired image.

In a step 42, the processing module 102 applies a region tracking method to the regions identified in each segmented image from the first segmented image to the second segmented image. As can be read in the document A. Yilmaz, O. Javed and M. Shah, □*Object tracking: a survey*□, *ACM Computing Surveys*, Vol. 38, 2006 the literature abounds with object tracking methods (i.e. tracking of regions). In one embodiment, the processing module 102 applies a method based on a Kalman filtering. Kalman filtering is described in the document R. E. Kalman, *A new approach for linear filtering and prediction problems*, *Journal of Basic Engineering*, vol. 82, 1960, P. 33-45. For example, the processing module uses a method described in the document N. Perterfreund, *Robust tracking of position and velocity with Kalman Snakes*, *IEEE Transactions on Pattern Analysis and Machine Intelligence*, vol. 21, no. 6, June or a method described in the document S. Saravanan and Dr. K. A. Parthasarathy, *Video object detection and tracking using Kalman filter and color histogram-based matching algorithm*, *International Journal of Engineering Research and Development*, Volume 9, Issue 7 (January 2014), pp. 31-39. In another embodiment, the processing module applies a method based on a gradient descent described in the document M. Bertalmio, G. Sapiro, G. Randall, *Morphing active contours*, *IEEE Transactions on Pattern Analysis and Machine Intelligence* 22, 7, 733-737, 2000 or a method described in the document Chen-Chien Hsu and Guo-Tang Dai, *Multiple object tracking using particle swarm optimization*, *World Academy of Science, Engineering and Technology International Journal of Electronics and Communi-* cation *Engineering*, Vol. 6, No. 8, 2012 or a method described in the document Zhou and al., *Object tracking using SIFT features and mean shift, Computer Vision and Image Understanding*, Volume 113, Issue 3, March 2009, Pages 345-352. Region tracking makes it possible to determine, among the regions identified in the second segmented image, which regions have a corresponding region in one or more previous segmented images in the image sequence. Some regions may thus be tracked over the entire sequence from the first segmented image to the second segmented image, while others may appear only in some images. This is for example the case when a finger is not pressed on the top face of the transparent plate 100 with equal force during the acquisition of the images in the sequence.

In an optional step 43, for each region of the second segmented region not having a corresponding region in a previous segmented image, referred to as a new region, the processing module determines that the new region corresponds to a region found in a previous segmented image, referred to as an existing region, if a criterion representing a correlation between a new region and at least one existing region is met. Step 43 therefore overcomes any defects in the region-tracking method. This is because regions in the second segmented image that have not been associated with regions of previous segmented image by the region-tracking method may all the same be associated with regions of previous segmented images. When the correlation criterion is met between a new region and an existing region, the processing module considers that the existing region is present in the second segmented image. Everything therefore happens as if the existing region had been tracked by the region-tracking method in the second segmented image.

In one embodiment, a correlation criterion between a new region and an existing region is a function of a ratio c1 between a surface area of an intersection between the two regions and a minimum surface-area value between the surface area of the new region and the surface area of the existing region:

$$c1 = \frac{S_{inter}}{\text{Min}(S_{NR}, S_{EX})}$$

where $S_{inter}$ is the surface area of the intersection between the existing region and the new region. $S_{NR}$ is the surface area of the new region, $S_{EX}$ is the surface area of the existing region and Min(A, B) is the minimum value between A and B.

Thus, if the measurement c1>C1, where C1 is a predetermined threshold, the processing module 102 considers that the new region corresponds to the existing region. In one embodiment C1=0.5, that is to say the two regions must have at least 50% of the surface in common in order to be matched.

In one embodiment, a measurement of correlation between a new region and an existing region is a function of a distance c2 between a centre of gravity of the new region and a centre of gravity of the existing region. Thus, if the distance c2<C2, where C2 is a predetermined distance threshold, the processing module 102 considers that the new region corresponds to the existing region. In one embodiment, the distance threshold C2=10 pixels.

In one embodiment, the processing module 102 uses a global measurement CG taking into account the ratio c1 and the distance c2. For example, the global measurement CG is as follows:

$$CG = c1 - e^{(c2-4)}$$

Thus, if CG>C1, the processing module 102 considers that the new region corresponds to the existing region.

Step 43 makes it possible to process the case where the same finger is segmented with one, two or three phalanxes according to the images. The region-tracking method then has difficulty in tracking although this is the same finger.

Figure 5A:
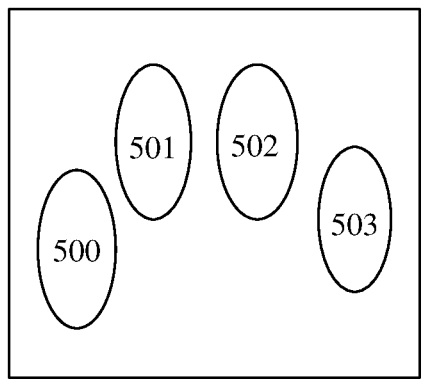
FIGS. 5A and 5B illustrate schematically a first case where a region tracking method could fail during a matching of regions.
Figure 5B:
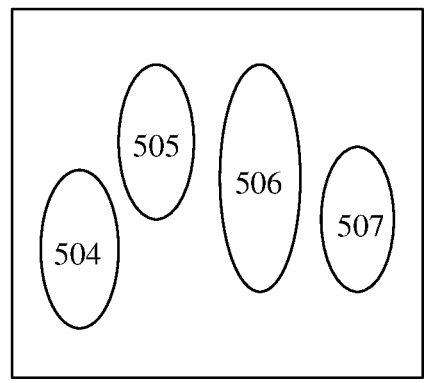

FIGS. 5A and 5B illustrate schematically a first case where a region-tracking method could fail when regions are matched.

FIG. 5A illustrates a first segmented image in which four regions have been detected by the segmentation method. FIG. 5B illustrates a second segmented image directly following the first segmented image in which four regions have also been detected by the segmentation method. The region-tracking method is capable of matching the region 500 with the region 504, the region 501 with the region 505 and the region 503 with the region 507. On the other hand, the region-tracking method is not capable of associating the region 502 with the region 506 since these two regions, although corresponding to the same finger, are very different. The region 506 corresponds in fact to two phalanxes of the finger whereas the region 502 corresponds to only one phalanx. In this case, step 43 makes it possible to associate the region 506 with the region 502. The region 502 is then considered to be present in the second image.

Figure 6A:
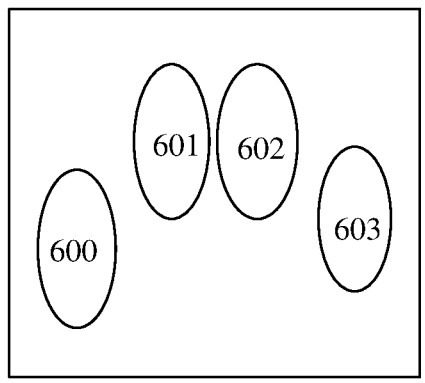
FIGS. 6A and 6B illustrate schematically a second case where a region tracking method could fail during a matching of regions.
Figure 6B:
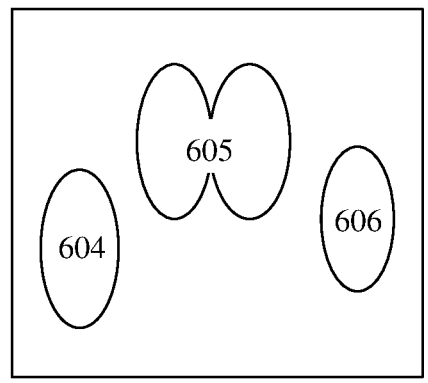

FIGS. 6A and 6B illustrate schematically a second case where a region-tracking method could fail when the regions are matched.

FIG. 6A illustrates a third segmented image in which four regions have been detected by the segmentation method. FIG. 6B illustrates a fourth segmented image directly following the third segmented image. Only three regions have been detected in the fourth region. The tracking method is capable of matching the region 600 with the region 604 and the region 603 with the region 606. However, the tracking method is not capable of matching the regions 601 and 602 with the region 605. This problem occurs when two fingers are very close and the proximity thereof leads the segmentation method into error since it does not in this case know whether it is dealing with one or two regions. In this case, step 43 makes it possible to associate the region 605 with both the region 601 and the region 602. The regions 601 and 602 are then considered to be present in the fourth image.

Step 42, or step 43 when it is executed, is followed by a step 45.

During step 45, the processing module 102 determines a confidence mark $\theta_{curr}$ for each region identified in each segmented image, the confidence mark $\theta_{curr}$ of a region of the second segmented image (i.e. the current segmented image) associated with a region of a previous segmented image being a sum between the confidence mark of said region of the previous image $\theta_{pre}$ and a first increment $\Delta 1(F)$ dependent on the predefined image acquisition frequency F.

$$\theta_{curr} = \theta_{pre} + \Delta 1(F)$$

The first increment is a decreasing function of the predefined image acquisition frequency F. For example:

$$\Delta 1(F) = \frac{K1}{F}$$

where K1 is a constant for example equal to 2.

During step 45, the confidence mark $\theta_{curr}$ of a region identified in at least one previous segmented image but not having a corresponding region in the second segmented image (i.e. the current segmented image) is a difference between the confidence mark of said region of the previous image $\theta_{pre}$ and a second increment $\Delta 2(F)$ dependent on the predefined image acquisition frequency F.

$$\theta_{curr}=\theta_{pre}-\Delta 2(F)$$

The second increment is also a decreasing function of the predefined image acquisition frequency F. For example:

$$\Delta 2(F) = \frac{K2}{F}$$

where K2 is a constant for example equal to 1.

Thus a region that is present in each image in the sequence has its mark increase more rapidly than a region that does not appear in some images in the sequence.

It should be noted that, for each new region that appears in a segmented image but which does not have a corresponding region in a previous segmented image, the confidence mark of said new region is initialised to zero when this region is identified by the segmentation method.

In a step 46, the processing module 102 determines a number N of regions, referred to as admissible regions, identified in the segmented images from the first segmented image to the second segmented image (i.e. current segmented image) having a confidence mark higher than a predetermined confidence threshold S1. For example, in one embodiment, the predetermined confidence threshold S1 is equal to 1.5.

In a step 47, the processing module 102 compares the number of admissible regions N with a predetermined number of regions S2. When the number of admissible regions N is equal to the predetermined number of regions S2, the processing module 102 ends the image acquisitions and generates information for obtaining an image, referred to as the final image, comprising, for each admissible region, a zone of an acquired image corresponding to the admissible region during a step 49. In one embodiment, the information generated is directly the final image. To generate the final image, the processing module 102 determines in which segmented image each of the S2 regions obtained a maximum confidence mark. When, for each region, a segmented image has been determined, the processing module 102 extracts, from the acquired image corresponding to the segmented image, the pixels situated in a zone corresponding spatially to the region of the segmented image and inserts them in the final image at the same position. The pixels of the final image that do not correspond to a region are set to a predefined value. The final image therefore represents prints on a uniform background.

In one embodiment, the information generated comprises information representing a set of pointers indicating, for each pixel to be used for generating the final image, the acquired image in which to seek said pixel and the position of said pixel in said acquired image.

When the number of admissible regions N is less than the predetermined number of regions S2, the processing module 102 compares, in a step 48, the period d since the acquisition of the first acquired image with a predetermined period D corresponding to a maximum acquisition time. The predetermined period D corresponds to a maximum time during which a user must leave his hand in the fingerprint capture system 10. In one embodiment, the predetermined period D is 2 seconds. If the period d is less than or equal to the predetermined period D, the processing module 102 returns to step 41, during which it obtains a new second segmented image.

If d>D, during step 49, the processing module 102 ends the image acquisitions and generates a final image with the regions that it has available. The final image then comprises a number of zones no more than the predetermined number of regions S2, each zone corresponding to a region identified in the segmented images from the first segmented image to the second segmented image, each region used for defining a zone having a confidence mark higher than the confidence marks of the zones not used for defining a zone. In other words, the processing module chooses a maximum number of regions among the regions identified in the segmented images, without exceeding the predetermined number of regions S2. The regions chosen are regions identified in the segmented images associated with the highest confidence marks. Among these chosen regions, some regions may have a confidence mark higher than the confidence threshold S1, and others a confidence mark below the confidence threshold S1.

The invention claimed is:

1. Method for obtaining an image of at least one fingerprint from a sequence of images acquired by an image sensor of a fingerprint capture system making acquisitions of images with a predefined image acquisition frequency dependent on said image sensor, wherein method comprises:
   obtaining an image, referred to as the first segmented image, resulting from an application of an image segmentation method to a first acquired image, said segmentation method being suitable for identifying regions corresponding to prints in an image;
   for each acquired image, referred to as the second acquired image, following the first acquired image, applying a processing comprising:
   obtaining an image, referred to as the second segmented image, resulting from an application of the image segmentation method to the second acquired image;
   applying a region-tracking method to regions identified in each segmented image from the first segmented image to the second segmented image;
   determining a confidence mark for each region identified, the confidence mark of a region of the second segmented image associated with a region of a previous segmented image being equal to a sum between the confidence mark of said region in the previous image and an increment inversely proportional to the predefined image acquisition frequency, and the confidence mark of a region identified in at least one segmented image preceding the second segmented image but not having a corresponding region in the second segmented image is a difference between the confidence mark of said region of the previous segmented image and of a second increment inversely proportional to the predefined image acquisition frequency; and
   determining a number of regions, referred to as admissible regions, identified in the segmented images from the first segmented image to the second segmented image having a confidence mark higher than a first predetermined threshold; and,
   when the number of admissible regions is equal to a second predetermined threshold, ending the acquisitions of images and generating information making it possible to obtain an image comprising, for each admissible region, a zone of an acquired image corresponding to the admissible region.

2. The method according to claim 1, wherein, for each region of the second segmented image not having a corresponding region in a previous segmented image, referred to as a new region, determining that the new region corresponds to a region found in a previous segmented image, referred to as an existing region, responsive to a criterion representing a correlation between the new region and at least one existing region being met.

3. The method according to claim 2, wherein the criterion representing a correlation between a new region and an existing region is dependent on a ratio between a surface area of an intersection between the existing region and the new region and a minimum surface-area value between the surface area of the new region and the surface area of the existing region and/or dependent on a distance between a centre of gravity of the new region and a centre of gravity of the existing region.

4. The method according to claim 1, wherein, when the number of admissible regions is below the second predetermined threshold, applying the processing for a new second acquired image responsive to a period of time since the acquisition of the first acquired image being less than or equal to a predetermined period of time.

5. The method according to claim 4, wherein, if the period of time since the acquisition of the first acquired image is greater than the predetermined period of time, ending the image acquisitions and generating information for generating an image comprising a number of acquired image zones no more than the second predetermined threshold, each zone corresponding to an identified region in the segmented images from the first segmented image to the second segmented image, each region used for defining a zone having a confidence mark higher than the confidence marks of the zones not used for defining a zone.

6. The method according to claim 1, wherein each increment is inversely proportional to the predefined image acquisition frequency.

7. A non transitory storage medium having stored thereon a computer program comprising instructions for performing the method according to claim 1, when said program is executed by a processor.

8. A device for obtaining an image of at least one fingerprint from a sequence of images acquired by an image sensor of a fingerprint capture system making acquisitions of images with a predefined image acquisition frequency dependent on said image sensor, wherein the device comprises at least one processor configured to:

obtain an image, referred to as the first segmented image, resulting from an application of an image segmentation method to a first acquired image, said segmentation method being suitable for identifying regions corresponding to prints in an image;

obtain at least one image, referred to as the second segmented image, resulting from an application of the image segmentation method to at least one image acquired following the first acquired image, referred to as the second acquired image;

apply a region-tracking method to the regions identified in each segmented image from the first segmented image to the second segmented image;

determine a confidence mark for each identified region, the confidence mark of a region of the second segmented image associated with a region of a previous segmented image being a sum between the confidence mark of said region of the previous image and an increment dependent on the predefined image acquisition frequency, and the confidence mark of a region identified in at least one segmented image preceding the second segmented image but not having a corresponding region in the second segmented image is a difference between the confidence mark of said region of the previous segmented image and of a second increment dependent on the predefined image acquisition frequency; and determine a number of regions, referred to as admissible regions, identified in the segmented images from the first segmented image to the second segmented image having a confidence mark higher than a first predetermined threshold; and end the acquisitions of images when the number of admissible regions is equal to a second predetermined threshold, and for generating information for obtaining an image comprising, for each admissible region, a zone of an acquired image corresponding to the admissible region.

9. A system comprising a device according to claim 8.

* * * * *